United States Patent
Haas et al.

(10) Patent No.: US 6,178,878 B1
(45) Date of Patent: Jan. 30, 2001

(54) BAKING OVEN FOR PRODUCING THIN-WALLED SHAPED PRODUCTS WITH BAKING FORMS EACH CONSISTING OF TWO FORM HALVES WHICH OPEN AND CLOSE

(75) Inventors: Franz Haas, Vienna; Johann Haas, Klosterneuburg; Johann Sachsenhofer, Vienna, all of (AT)

(73) Assignee: Franz Haas Waffelmaschinen-Industrie Aktiengesellschaft, Vienna (AT)

(*) Notice: Under 35 U.S.C. 154(b), the term of this patent shall be extended for 0 days.

(21) Appl. No.: 09/423,495
(22) PCT Filed: May 11, 1998
(86) PCT No.: PCT/AT98/00121
  § 371 Date: Nov. 19, 1999
  § 102(e) Date: Nov. 19, 1999
(87) PCT Pub. No.: WO98/51156
  PCT Pub. Date: Nov. 19, 1998

(30) Foreign Application Priority Data

May 9, 1997 (AT) ........................................ 789/97

(51) Int. Cl.[7] ................ A23L 1/00; A47J 37/00; A47J 37/01; A21B 5/02; A21C 11/00
(52) U.S. Cl. ................ 99/353; 99/372; 99/373; 99/374; 99/383; 99/427; 99/443 C
(58) Field of Search ............... 99/353–355, 372–380, 99/381, 383, 384, 426–428, 439, 479, 450.6, 443 C, 450.7, 443 R; 249/166, 168; 425/451.9, 322, 595, 451.5, DIG. 221; 292/256.72, 304, 210; 426/231–233, 94, 283, 284, 496, 391

(56) References Cited

U.S. PATENT DOCUMENTS

| | | | |
|---|---|---|---|
| 4,669,603 | * | 6/1987 | Haas, Sr. et al. .................... 198/432 |
| 4,694,741 | * | 9/1987 | Haas, Sr. et al. ...................... 99/354 |
| 4,953,453 | * | 9/1990 | Haas, Sr. et al. ...................... 99/373 |
| 5,048,403 | * | 9/1991 | Haas, Sr. et al. ...................... 99/355 |
| 5,103,717 | * | 4/1992 | Haas, Sr. et al. ...................... 99/353 |
| 5,463,939 | * | 11/1995 | Koletnik et al. ...................... 99/353 |
| 5,795,607 | * | 8/1998 | Haas et al. .......................... 426/391 |

FOREIGN PATENT DOCUMENTS 714019  11/1941 (DE).
WO 95/26635  10/1995 (WO).

* cited by examiner

*Primary Examiner*—Timothy F. Simone
(74) *Attorney, Agent, or Firm*—Herbert Dubno

(57) ABSTRACT

A baking oven has a multiplicity of baking sheet units stacked one above the other and added to below, after bakable mass has been deposited on a lower most member of the stack, so that the individual molds formed by each upper and lower sheet are closed and held closed by the weight of the sheets above it. The sheets are separated at the top of the stack and recycled to the bottom to receive a new portion of the bakable material.

6 Claims, 5 Drawing Sheets

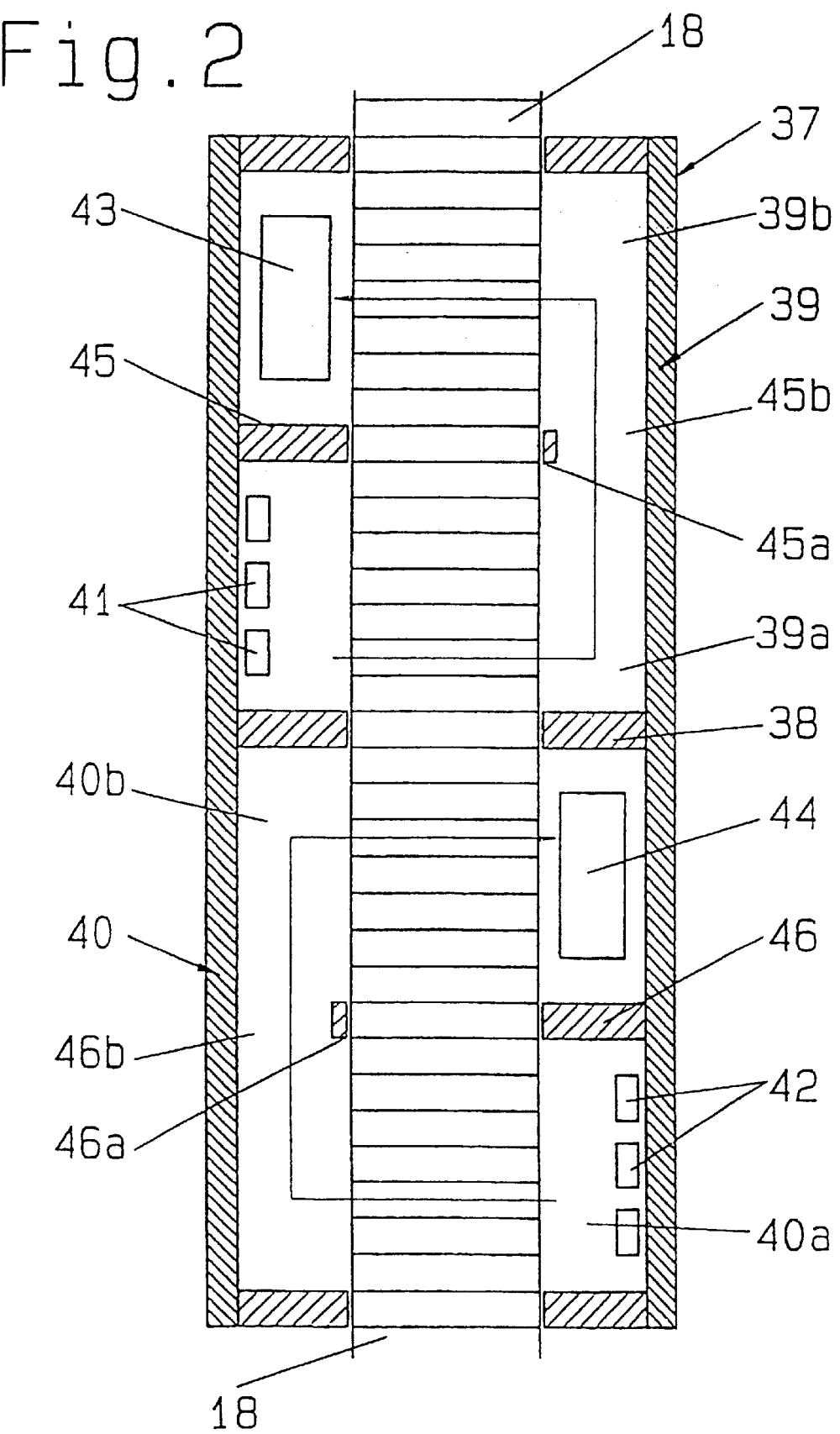

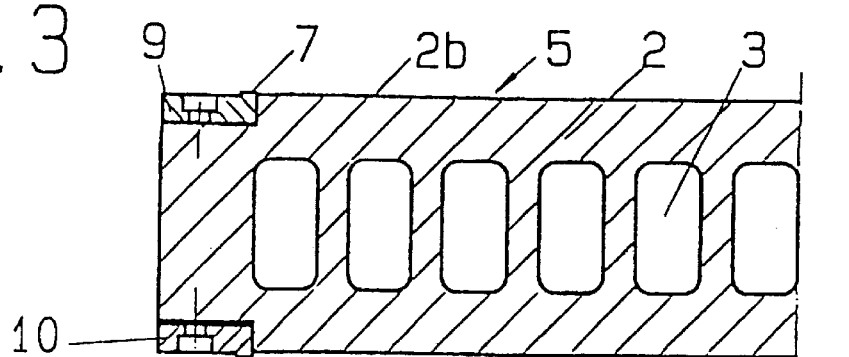
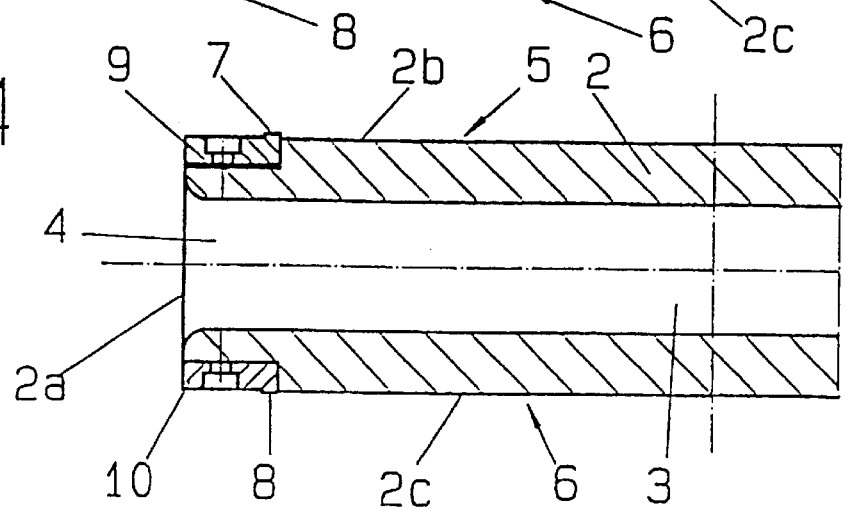
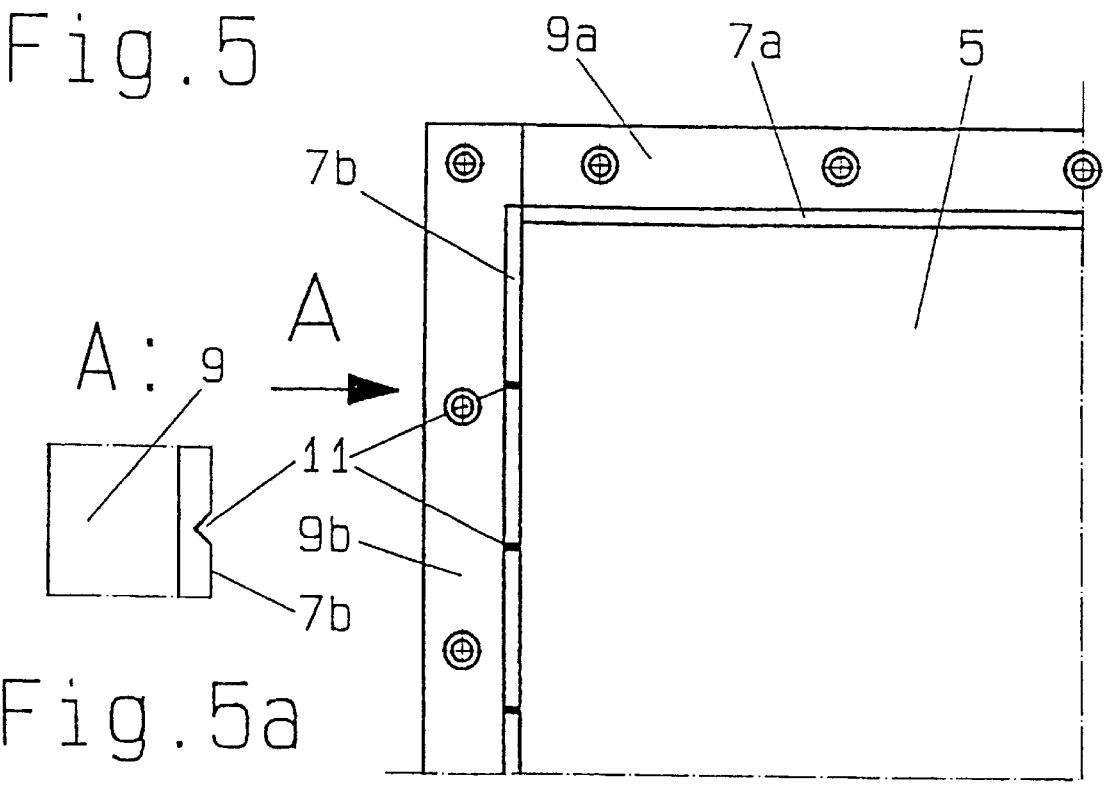

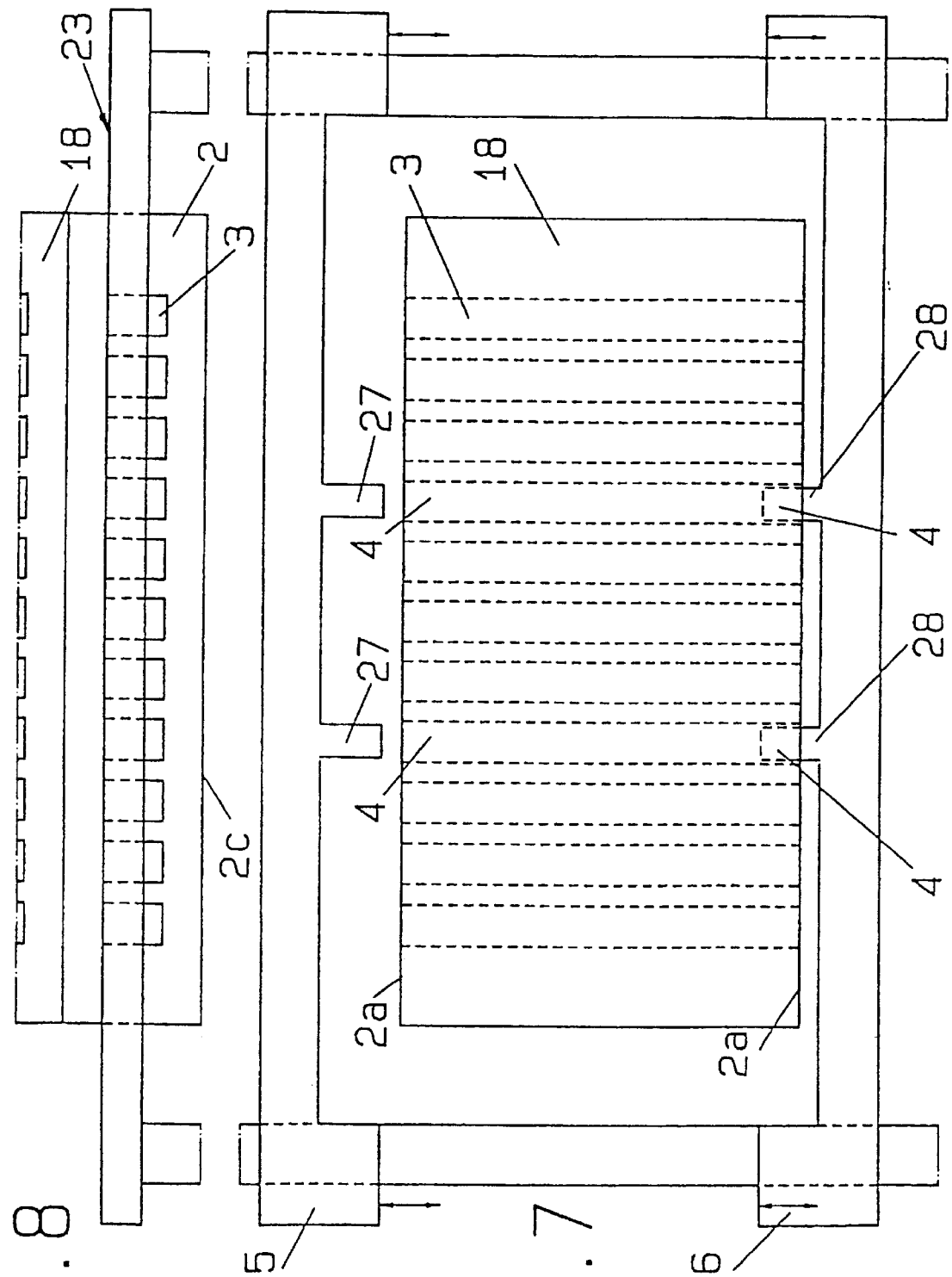

BAKING OVEN FOR PRODUCING THIN-WALLED SHAPED PRODUCTS WITH BAKING FORMS EACH CONSISTING OF TWO FORM HALVES WHICH OPEN AND CLOSE

CROSS REFERENCE TO RELATED APPLICATIONS

This is a national stage of PCT/AT98/00121 filed May 11, 1998 and based upon Austrian national application A789/97 of May 9, 1997 under the International Convention.

FIELD OF THE INVENTION

The invention relates to baking ovens through which baking molds consisting of two opening and closing mold halves are transported and into which, the open state pre-products are placed, which in the closed baking molds are transformed into thin-walled shaped products, whose configuration corresponds to the hollow space defined by a closed baking mold.

As pre-products shapeless masses can be used, which harden in the closed baking molds, or shapeless masses which in the closed baking molds are baked into thin-walled shaped products. As shapeless baking masses for human consumption certain doughs can be used, for instance sugarless or sugar-containing wafer doughs, which according to the dough recipe, are baked into crisp, crunchy wafers or to soft wafers, or other baking doughs used in the production of sweetened or non-sweetened bakery products. As shapeless baking masses it is also possible to use starch-based baking masses not suited for human consumption, which are baked into the form of decayable packaging trays or of other decayable starch-containing packaging products.

As pre-products it is also possible to use preshaped bodies to be integrated in the thin-walled shaped products to be produced, which are introduced in the molds together with the shapeless mass, or preshaped bodies which assume a different configuration in the closed molds. The preshaped bodies can be themselves thin-walled shaped products which were made from shapeless masses.

BACKGROUND OF THE INVENTION

In the known longitudinally arranged baking ovens for the production of thin-walled shaped bodies from shapeless masses, for the production of shaped bodies opening and closing mold halves are contained in 18 to 140 opening and closing baking tongs, whereby each mold with both its mold halves is received in the two tong halves of a baking tongs. The baking tongs are connected in an endless chain, which runs continuously through the antechamber and subsequent baking space of the respective baking oven in one direction. When passing through the antechamber, the baking tongs are opened to open of their baking molds, first in order to remove the respective thin-walled shaped body from the open baking mold, and then to introduce a measured amount of the shapeless mass into the opened baking mold. Subsequently the baking tongs are closed to close its baking mold. During the subsequent passage through the oven, the baking molds are heated and each shapeless mass enclosed in the closed baking molds is baked into a thin-walled shaped body, while the baking molds are kept closed against the inner pressure generated inside them during baking.

In these baking ovens the longitudinally extending endless baking tong chain is arranged in two superimposed transport levels through the respective longitudinally extending baking space, and is guided from the one transport level to the other transport level at the rear end of the baking space and at the front end of the antechamber frontally connected to the baking space.

Each baking tong is designed as an externally actuatable machine, by means of which the therein contained baking mold is transported through the baking oven, opened and closed and kept closed. When passing through the antechamber, the baking mold is opened by means of its baking tongs, kept open for a short time and then closed again. When passing through the baking space, the closed baking mold is kept closed by means of its baking tong. The endless baking tong chain is driven by a driving motor, which produces a continuous revolving motion of the baking tong chain. Because of this continuouse motion each baking tong is subjected to the same motion sequence. When in the antechamber they pass the respectively assigned control mechanisms, stationarily arranged in the antechamber, which in connection with the revolving motion of the baking tong chain produce each time the respective motion sequence of the baking tongs, or of its parts.

When running though the antechamber the open baking tongs pass the product removal station, wherein the baked shaped bodies are removed from the opened baking molds and are discharged from the antechamber via the discharge station of the oven. After the product removal station, the opened baking tongs pass the loading station, wherein the measured amount portions of the shapeless mass are introduced into the empty, open baking molds. During its travel through the longitudinally extending, horizontal baking space of the oven, the closed molds are heated in the closed baking tongs. In a gas-heated oven the baking molds are heated from the outside with hot gases, which are generated in the baking space of the oven and directed towards the baking tongs. In an electrically heated oven the baking molds are heated by means of the electric heating elements built into the tong halves of the baking tongs, which during their travel through the baking space are supplied with electric energy from an external source.

The thin-walled shaped bodies are produced in successive cycles, in the baking molds transported in cycle through the baking space by the baking tongs. Each baking cycle takes place in the respective baking mold during its travel from the loading station through the baking space to the product removal station. In each single baking cycle, in the loading station a shapeless mass is introduced into the baking mold previously opened by its baking tongs, the baking mold is closed and kept closed by means of its baking tongs, until it is opened again by means of its baking tong before it reaches the product removal station, and the thin-walled shaped body is removed from the open baking mold.

When the open baking mold is again transported by its baking tongs to the loading station, then in this baking mold starts the next baking cycle for the production of a thin-walled shaped body.

In each baking cycle, during the baking process in the mold kept closed from the outside by the baking tongs, the shapeless mass enclosed in the closed baking mold is distributed, foamed up and baked under pressure into a foamed, thin-walled shaped body. The outer configuration of the resulting thin-walled shaped body is determined on its upper side by the surface configuration of the baking surface of the upper mold half and on its underside by the surface configuration of the baking surface of the lower mold half of the baking mold. The wall thickness of the resulting thin-walled shaped body is determined by the distance between these two mutually facing baking surfaces, when the mold is closed. The contour of the outer border of the resulting thin-walled shaped body is determined by the lateral limits of the hollow mold space of the closed baking mold.

When the baking mold and the baking tong are closed, the two tong halves and the two mold halves lie opposite to each other. The tong halves are supported against each other by means of assigned mutually opposite stops. The baking surfaces arranged on the frontal side of the baking molds are faced each other and are opposite to each other at a predetermined distance. These two substantially horizontally arranged baking surfaces define between them the hollow mold space of the closed baking mold which, depending on the product to be made in the baking mold into a thin-walled shaped body, is laterally open, or laterally limited all around by sealing strips, but not closed up to be gastight. In this hollow mold space a measured amount of the shapeless mass is baked under pressure into a thin-walled shaped body. The baking gases formed during baking in the hollow mold space cause the foaming of the shapeless mass, distribute it throughout the hollow mold space and flow out laterally from the hollow mold space of the closed baking mold, between the two baking surfaces, into the baking space of the respective baking oven. When the baking mold and the baking tong are closed, the baking gases create an inner pressure in the hollow mold space of the baking mold, which is transmitted via the baking surfaces to the mold halves and from these to the tong halves of the baking tongs. This inner pressure is counteracted by the closed baking tongs, which during their revolution, depending on the baking tong and the baking mold, are kept closed either by the inherent weight of their tong halves, or by stationary closing means acting from the outside, or due to baking tong locks laterally mounted on their tong halves, thereby preventing their tong halves lying against each other with their stops from being moved apart by the baking gases.

The inner pressure produced by the baking gases increases in the initial phase of the baking process due to the very intense gas development and decreases with the progressive escape of the baking gases from the hollow mold space. The thereby occurring pressure maximum of the inner pressure depends mainly on the design of the lateral limitation of the hollow mold space, and is therefore considerably lower in a hollow mold space which is completely open laterally than in a hollow mold space which is bordered all around by sealing strips and wherefrom the gases can leave only through a few steam slots of the sealing strips.

In the case of a baking tong whose articulately joined tong halves contain a baking mold which in the closed state defines a laterally open hollow mold space, wherein the inner pressure increases only slightly during baking, the baking mold is kept closed by the inherent weight of the respective tong half lying over the hollow mold space, or by a stationary closing mechanism, which prevents the tong halves of a baking tongs passing by from being moved apart.

Baking tongs whose tong halves contain the mold halves of baking molds which in the closed state define a hollow mold space which is laterally limited all around by sealing strips, wherein the inner pressure increases strongly during baking, are kept closed laterally on two opposite sides of the respective baking tong. In the case of tong halves linked by an articulation, on the side of the baking tong opposite to the articulation a baking tong lock is provided, which is securely locked when the baking tongs is closed. In baking tongs without articulations, whose tong halves are rectilinearly moved towards and away from each other for opening and closing the baking mold, on each of two opposite sides of the baking tong a baking tong lock is provided, which is securely locked when the baking tongs is closed. Each baking tong lock is a mechanism built into the respective baking tong, which is externally actuated when the baking tongs is closed, which in the locked state rigidly connects the two tong halves. Each baking tong lock has to be actuated after the closing of the baking tong and prior to the opening of the baking tongs.

In the known baking ovens, in the baking tongs, respectively in their baking tong halves, flat baking plates are integrated, which are formed on the frontal side as upper or lower mold halves of the baking molds and are heated on their rear side.

From the point of view of construction, layout and function, from the loading station via the individual baking molds and the revolving baking tongs containing the same, to the stationary control mechanisms causing the motions of the individual parts of the revolving baking tongs and to the discharge station for the thin-walled shaped bodies, the known longitudinally extending baking ovens with their continuously revolving baking tong chains are specifically set up exclusively for the production of thin-walled shaped bodies having a single predetermined configuration from shapeless masses prepared according to a certain recipe.

Such baking ovens are used for the industrial production of edible wafers, which are baked in the revolving baking molds of the baking tongs from fluid wafer doughs, which consist primarily of wheat flour and water. Depending on the baking oven and the wafer dough, the consistency of the produced wafers can be crisp, crunchy and brittle wafers, with a moisture content of maximum 1%–4%, or they can have the consistency of soft, elastic wafers with a moisture content of 8% or more.

Such baking ovens are also used for the industrial production of flat decomposable packaging trays, which are baked in the revolving baking molds of the baking tongs from pourable starch-based shapeless masses and which have an elastic consistency with a moisture content of 6% to 22%.

The known longitudinally extending baking ovens with their endless baking tong chains comprising 18 to 140 baking tongs are mechanically very cumbersome machines. The baking molds are received in the baking tongs composed of several components and run through the baking space on lateral running wheels in lateral guide rails on both transport levels of the baking oven. In the antechamber along the guide path of the baking tongs, control cams and mechanisms produce the motions of the tong halves for the opening and closing of the baking molds and the motions of the locking elements of the baking tong locks for locking and unlocking of the closed baking tong. Mechanically cumbersome is also the endless baking tong chain, for which a pneumatic or hydraulic chain-tensioning device mounted on the oven frame is required, and which in addition to the baking tongs also consist of two lateral transport chains, which interconnect the baking tongs and run over chain guides arranged at both ends of the baking oven.

In the known longitudinally extending baking ovens for the production of thin-walled shaped bodies the difference in the production capacity of thin-walled shaped bodies determined by the number of its baking tongs, or baking molds, shows up only in the differences in the length of the baking ovens or their baking spaces. When an existing longitudinally extending wafer baking oven has to be replaced by a new longitudinally extending baking oven with a higher capacity, then at the site of the baking oven a longer construction space is required for the new baking oven. Under limited space conditions, the length available at the site becomes very quickly a limiting factor for any further capacity increase of the longitudinally extending baking oven and the production installations connected thereto for the further treatment and processing of the thin-walled shaped bodies up to the packaging machine for the end product produced from the thin-walled shaped bodies, which is provided at the end of the respective production installation.

From German Patent 714 019 a wafer baking machine is known wherein wafer molded boxes are guided in the side walls of the machine by lateral running rollers. The wafer mold boxes at their top and bottom sides have depressions corresponding to the pattern of the upper or lower side of the wafer to be produced, each carrying lateral hook catches projecting downwards beyond the lower side and thereto assigned locking pins close to their upper side. In a lower transport level, these molding boxes are filled with a baking mass at their upper side and continuously assembled into baking molds at the lower end of a molding box stack supported on stationary catches and extending through a vertical baking shaft upwards to an upper removal station for the baked wafers, each of them consisting of two superimposed molding boxes, rigidly connected by means of the hook catches of the upper box fastened to the locking pins of the lower box. At the lower end of the baking shaft each time a molding box filled with baking mass at its upper side is pressed from below into the baking shaft by means of a crank of a connecting rod gear and joined together with the lowest molding box of the molding box stack to form a baking mold. Thereby the entire molding box stack is lifted by the stationary catches, and lifted by one molding box height, whereby the hook catches of the lowermost molding box in the stack lock into the locking pins of the newly arrived molding box, and then the entire stack with its newest lowermost molding box is again deposited on the stationary catches. With each addition of a molding box at the lower end of the stack, the baking molds in the stack travel stepwise upwards through the baking shaft, while wafers are baked in the baking molds formed by them. When the stack is lifted, in the uppermost baking mold of the stack the hook catches of the upper molding box are swung away from the locking pins of the underlying molding box and the uppermost molding box is coupled to the two endless link chains of an endless conveyor running in the side walls of the machine frame, which lifts this molding box by releasing the uppermost baking mold from the molding box stack and transports it through an upper transport level and a rear vertical transport stretch into the lower transport level, back to the lower end of the baking shaft, where this molding box is again uncoupled from the link chain of the endless conveyor. When the uppermost molding box is lifted from the stack, the baked wafer is left lying on the upper side of the underlying molding box and is removed from this molding box in the upper removal station by means of a stripper. This wafer baking machine has short baking shaft with a low molding box stack, which consists of a few, relatively thin-walled molding boxes, which are rigidly interconnected by means of hook catches and locking pins, in order to be able to withstand the high inner pressures occurring during the baking of the wafers in the baking molds formed by the molding boxes.

OBJECT OF THE INVENTION

It is the object of the invention to provide a compact baking oven for the production of thin-walled shaped bodies in baking molds, each consisting of two mold halves which can be opened and closed.

SUMMARY OF THE INVENTION

According to the invention, a baking oven for the production of thin-walled shaped bodies in baking molds comprises of two mold halves which can be opened and closed, which define with their mold halves the outer configuration of the shaped bodies produced therein. In this baking oven stackable baking sheets units passing through a closed cycle are provided, which on their top side carry the bottom mold halves of the baking mold and on their bottom side carry the top mold half of the baking molds and which lying on top of each other in pairs form closed baking molds. In a bottom loading station, each baking sheet unit is loaded at its upper side with the pre-product and then integrated in a vertical stack consisting of baking sheet units resting on a bottom support device and which extends upwards through a vertical baking shaft to a top removal station for the baked shaped bodies. At its upper end the stack is constantly dismantled into separate baking sheet units and is constantly replenished at the bottom by a stacking device due to the continuous addition of baking sheet units loaded with the pre-product, so that the baking molds formed by the baking sheet units travel upwards and stepwise through the baking shaft, while the pre-products contained in the baking molds are baked into thin-walled shaped bodies. According to the invention the baking sheet units are only loosely stacked on top of each other, and each individual baking mold formed by two superimposed baking sheet units is kept closed against the inner pressure generated during baking only by the weight of the respective stack part resting thereon, while within the stack it travels upwards in steps through the vertical baking shaft, to the top removal station.

The construction of the invention allows for a clear reduction of the number of parts of the baking oven which have to be constantly moved, by substituting the transport device extending along the baking shaft with the constantly replenished baking mold stack, which is constantly renewed or dismantled outside the baking shaft. The constantly renewed baking mold stack, which is kept together by its own weight requires clearly less maintenance than a transport device for the closed baking molds extending along the baking shaft, or the endless baking mold chain of a known longitudinally extending baking oven, which in its baking tongs contains the baking molds and which continuously revolves with all its movable parts in the horizontal hot baking space of the baking oven.

The construction of the baking oven according to the invention can do without the lateral locking devices required in the known baking ovens for the connection of the two mold parts and without the lateral running wheels required in the known baking oven for guiding the baking sheet units within the baking oven. In the construction of the baking oven according to the invention the constantly replenished stack of stackable baking sheet units which can be used on both sides, moving through the vertical baking shaft, has no mobile parts which are transported through the baking shaft and which require expensive materials and complicated constructions due to the high temperatures in the baking shaft.

According to a further feature of the invention, above the baking shaft a separating device can be provided, which removes the baking sheet units one after the other from the top of the stack, for the purpose of dismantling the stack and opening the baking molds.

According to a further feature of the invention, outside the baking shaft, a separate vertical conveyor running in the opposite direction can be provided for the return transport of the baking sheet units to the bottom loading station.

According to a further feature of the invention, the baking sheet units can each be provided with mutually corresponding upper, respectively lower stacking surfaces, by means of which they lie loosely on top of each other within the stack.

According to a further feature of the invention, on the top side of a baking sheet unit several baking mold parts designed as lower baking mold halves can be arranged next to each other, and on the bottom side of a baking sheet unit several baking mold parts designed as upper mold halves can be arranged next to each other.

According to a further feature of the invention, the upper stacking surfaces of the baking sheet units assigned to the top side can be each integrated in the sealing strips of the lower baking mold halves arranged on the top side of the baking sheet unit, whereby the baking sheet units lie loosely on top of each other with the sealing strips of their baking mold halves within the stack formed by them.

The stackable baking sheet units which can be used on both sides with the baking mold halves arranged on their top side or bottom side, allow for a twisting and bending resistant construction of the sheet body which supports the back of the baking surfaces, whereby the heating channels built into the sheet body further reinforce the sheet body. The mutually facing stacking surfaces allow for a precise mutual placement of the two mold halves of a baking mold which is formed between two superimposed baking sheet units during the closing of the baking mold or when the two baking sheet units are placed one on top of the other.

The stackable baking sheet units can be made in one piece, whereby the baking surfaces and the stacking surfaces arranged on their top and bottom sides can be integrated in the respective sheet body.

The stackable baking sheet units can each consist of a top part formed by the upper baking sheet and a bottom part formed by the lower baking sheet. The upper baking sheets, together with the lower baking mold halves formed on their frontal sides, form the top sides of the baking sheet units, and together with the reinforcement ribs formed on their back side, they form the upper part of the bordering walls of the heating channels of the baking sheet units. The lower baking sheets, together with the upper baking mold halves formed on their frontal sides, form the bottom sides of the baking sheet units, and together with the reinforcement ribs formed on their back sides form the lower part of the border walls of the heating channels of the baking sheet unit. At their back sides, these upper and lower baking sheets lie on top of each other with the frontal sides of their reinforcement ribs and are rigidly connected with each other in pairs to the respective baking sheet unit.

These two-sided usable, stackable baking sheet units, which can be made in one piece, or of a parallelepipedic plate body with baking sheets attached to its top and bottom sides, or of two baking sheets resting against each other with their back sides, are stacked on top of each other for forming baking molds and thereby pushed against each other from below, with their mutually assigned stacking surfaces. Thereby an upper mold half formed on the bottom side of the upper baking sheet unit is put together with a lower mold half formed on the top side of the lower baking sheet unit to form a baking mold and this baking mold is being closed at the same time. The closed baking mold limited at the top and the bottom by two superimposed baking sheet units can contain a single hollow space for the production of thin-walled shaped bodies. This baking mold can also contain several hollow mold spaces of equal size for the simultaneous production of several thin-walled shaped bodies in a single baking mold. This baking mold can also contain several hollow mold spaces of various configuration for the simultaneous production of several different thin-walled shaped bodies in a single baking mold.

In the stack according to the invention, consisting of stackable baking sheet units which can be used on both sides and which is constantly replenished at its bottom end constantly again dismantled at its top end, at the bottom end the baking sheet units are stacked from below one on top of the other, and at the upper end are separated, whereby in the loading station assigned to the bottom end of the stack a new baking sheet unit is loaded at its top side with pre-product, before it is integrated in the next stacking step into the stack resting with its entire weight on the lowermost baking sheet unit. The new baking sheet unit is moved underneath the stack and pressed against the lowermost baking sheet unit of the stack, until it bears the entire stack weight as its lowermost baking sheet unit. In this stacking step, the stack is replenished at its bottom end with a baking sheet unit and at the same time the upper mold half formed on the bottom side of its lowermost baking sheet unit is put together with the lower mold half filled with pre-product on the top side of the new baking sheet unit to form a new closed baking mold. This baking mold is the lowermost baking mold in the baking mold stack formed by the baking sheet units stacked on top of each other. The hollow mold space of this baking mold is kept close against the inner pressure generated during baking by the weight of the entire stack. This baking mold travels upwards together with the two baking sheet units defining its hollow mold space by one level with each further stacking step, and on each level it is kept closed by the weight of the part of the stack existing above this level. At the top end of the stack the hollow mold space of the baking mold is kept closed only by the weight of the upwardly limiting baking sheet unit, and when this baking sheet unit is lifted at the dismantling of the stack, it is also opened. The thin-walled shaped body produced in this hollow mold space remains on the top side of the lower baking mold half formed on the uppermost baking sheet unit of the stack and can be removed directly therefrom.

The two-sided usable, stackable baking sheet units are transported through the respective baking oven in a close cycle and pass through the vertical shaft of the baking oven in a vertical stack, which consists of stacked baking sheet units lying on top of each other and is continuously replenished at its bottom end with one baking sheet unit and continuously reduced by one baking sheet unit at its top end. The two-sided usable, stackable baking sheet units make it possible to combine the formation process of the respective stack with the closing process of the baking molds and to combine the dismantling process of the stack with the opening process of the baking molds, so that no additional mechanisms or actuating devices are required for the baking sheet units in order to close the baking molds after they are loaded with pre-product and for the opening of the baking molds prior to the removal of the baked shaped body. The stacking device of the baking oven forming the stack stacks the sheets from below one on top of each other, thereby closing the baking molds. The separating device of the baking oven which dismantles the stack lifts the baking sheet units from the respective stack and thereby opens the baking molds at the same time, respectively separates them into their baking mold halves.

BRIEF DESCRIPTION OF THE DRAWING

The above and other objects, features, and advantages will become more readily apparent from the following description, reference being made to the accompanying drawing in which:

FIG. 2 is a cross sectional view showing schematically a segment of the transport path traversing the vertical baking shaft for the production of thin-walled shaped bodies, FIG. 3 is a section of a part of a stackable baking sheet unit for the production of thin-walled shaped bodies, FIG. 4 shows the part of the stackable baking sheet units of FIG. 3 in a longitudinal section, FIG. 5 shows a segment of a sealing strip of the stackable baking sheet units of FIG. 3, in a side view, FIG. 5a is a detail of FIG. 5 in the direction of arrow A;

FIG. 7 is a top view of a support device for a vertical stack formed by stackable baking sheet units, arranged at the lower end of the vertical transport path for the production of thin-walled shaped bodies, and FIG. 8 is a side view of the support device of FIG. 7.

SPECIFIC DESCRIPTION

Figure 1:
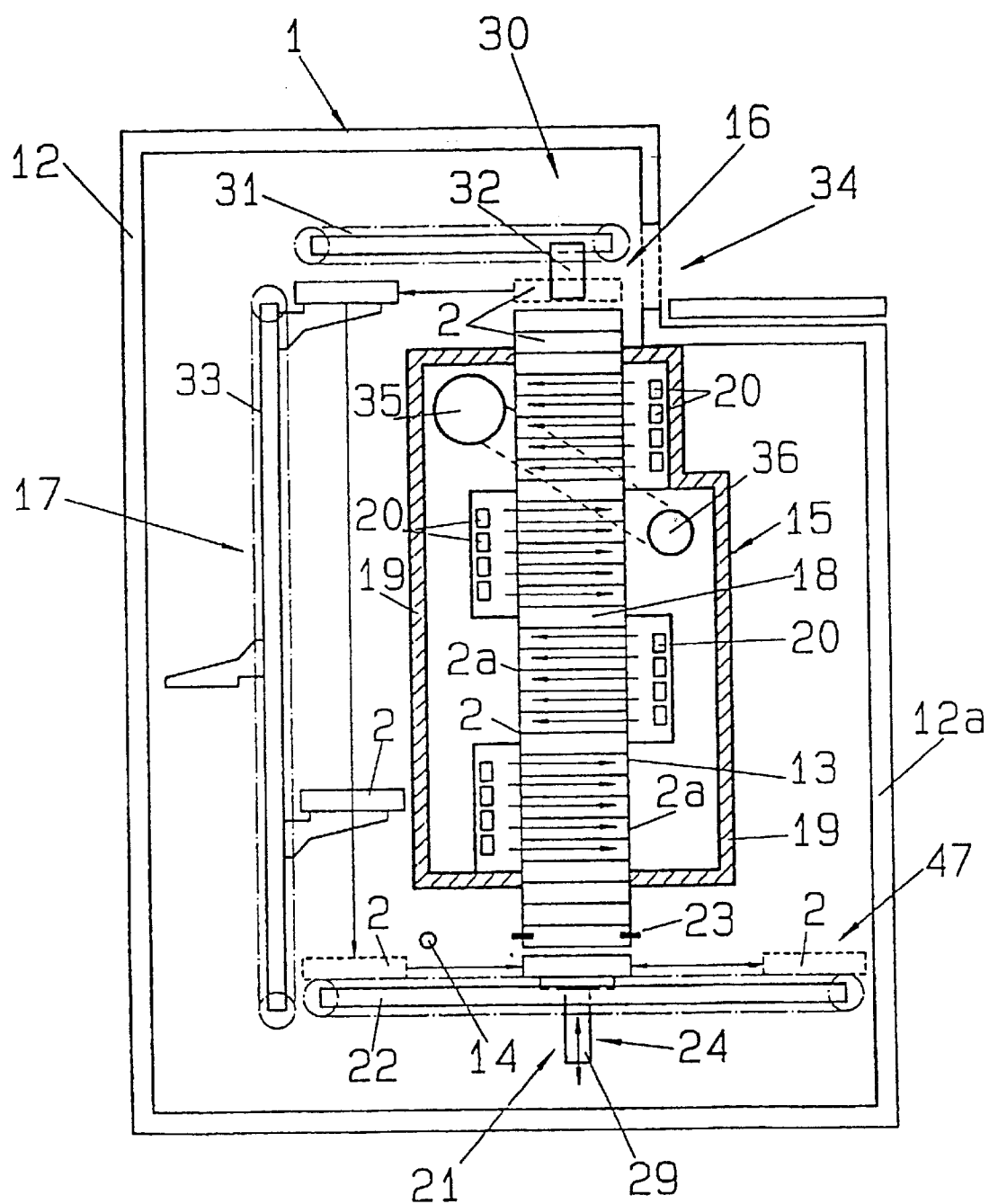
FIG. 1 schematically in section a baking oven with a vertical transport path for the production of thin-walled shaped bodies.
Figure 6:
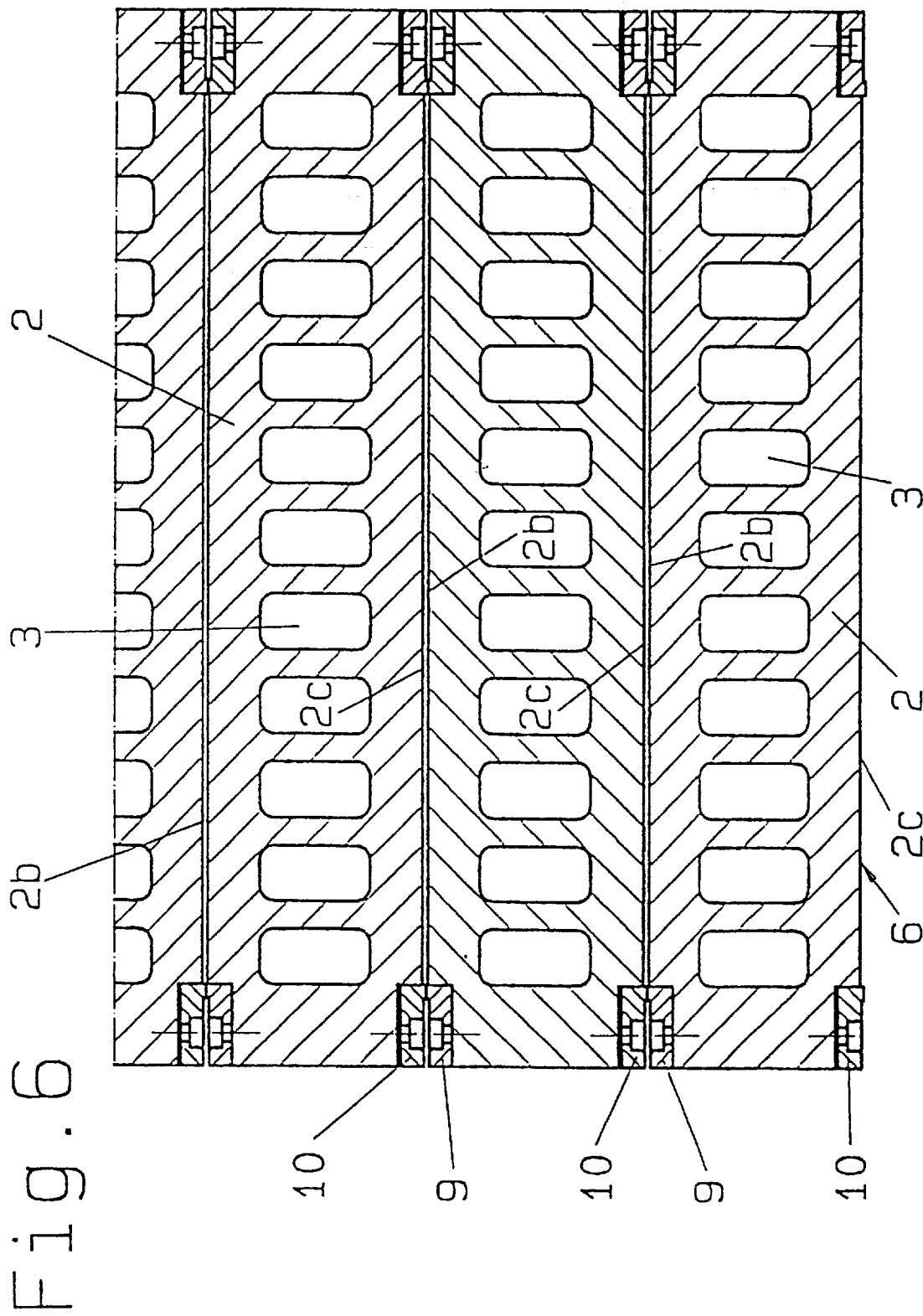
FIG. 6 is a section of a segment of a vertical stack formed by baking sheet units stacked on top of each other, wherein the baking sheet units within the stack lie loosely on top of each other and are kept together only by the weight.

FIG. 1 shows a gas-heated baking oven 1 for the production of thin-walled shaped bodies, which for instance are flat rectangular sheets which at their upper and lower sides have wafer patterns formed by raised ribs. These thin-walled shaped bodies are made of a shapeless mass in baking molds which can open and close, each consisting of two mold halves which determine the outer configuration and the wall thickness of the thin-walled shaped body.

For the formation of the baking molds which can open and close, stackable baking sheet units 2 (FIG. 2–5a) which can be used on both sides are provided. These molds have parallelepipedic plate bodies which can be heated through heating channels and are provided on two opposite frontal sides 2a (FIG. 4) with lateral holding openings 4, and which on the top sides 2b and the bottom sides 2c (FIG. 3) carry baking surfaces 5, 6 and the thereto assigned stacking surfaces 7, 8. The top sides 2b of the baking sheet units 2 are designed as lower mold halves of the baking molds, and the bottom sides 2c of the baking sheet units 2 are designed as upper mold halves of the baking molds. Two superimposed baking sheet units 2 lie with their mutually facing stacking surfaces 7, 8 on top of each other and form together a closed baking mold for the respective thin-walled shaped body to be produced. This baking mold consists of the upper baking mold half arranged on the bottom side 2c of the baking sheet unit 2 and of the lower mold half arranged on the top side 2b of the lower baking sheet unit 2. The stackable baking sheet units 2 which can be used on both sides with the respective therein integrated baking mold halves are set for the production of a certain thin-walled shaped body.

Baking sheet units 2 for the production of flat rectangular sheets have basically a rectangularly shaped plate body. On the top side 2b and the bottom side 2c of the plate body a substantially flat, rectangular baking surface 5, 6 defined by lateral sealing strips 9, 10 is formed. The stacking surfaces 7, 8 of the baking sheet units 2 are integrated in these sealing strips 9, 10, each of them protruding beyond the baking surface 5, 6 they define and together with the same form the upper baking mold half 5, 9 or the lower baking mold half 6, 10 of the baking sheet unit 2. In the lower baking mold half 5, 9 at least one steam channel 11 traversing at least one sealing strip 9b is formed in two opposite sealing strips 9b. Two baking sheet units 2 stacked on top of each other lie with the sealing strips 9 and 10 of their mutually facing baking mold halves 5, 9, respectively 6, 10 on top of each other and form a closed baking mold, which is completely closed except for the lateral steam channels, through which the gases generated during baking can escape when the baking mold is closed.

Baking sheet units for the production of round, triangular, pentagonal or fan-shaped flat layers can basically have a plate body with round, triangular, pentagonal, or fan-shaped baking surfaces on their top and bottom sides, each defined by lateral sealing strips wherein the stacking surfaces of the respective baking sheet unit are integrated. However these baking sheet units can also have parallelepipedic plate bodies corresponding in shape to the layer to be produced with a round, triangular, pentagonal or fan-shaped base.

Baking sheet units for the production of thin-walled bodies shaped like rectangular trays slightly opening upwards, have basically a rectangular plate body which on the top side carries an upper baking surface provided with a depression corresponding to the configuration of the tray, and on the it bottom side a lower baking surface provided with a raised portion corresponding to the configuration of the tray. Both baking surfaces are limited by sealing strips which correspond to the contour of the tray and contain the stacking surfaces of the baking sheet unit.

Baking sheet units for the production of thin-walled shaped bodies, which are shaped as flat layers with undefined borders have a parallelepipedic plate body on whose top and bottom sides baking surfaces corresponding to the respective contour of the flat layers to be produced are arranged, and outside the same spacers are arranged which determine the wall thickness of the shaped body area provided, wherein the upper, respectively lower stacking surfaces of the baking sheet unit are integrated.

In the baking oven shown in FIG. 1 the two-sided usable, stackable baking sheet units 2 are transported through the baking oven 1 in a closed cycle inside of the outer heat-insulating lining 12 of the baking oven 1. This cycle comprises a vertically upwards leading transport path 13, at the beginning of which the baking sheet units 2 are stacked on top of each other for the formation of baking molds and at whose end for the opening of the baking molds the baking sheet units 2 are again separated. This vertical transport path 13 for the closed baking molds leads from a lower loading station 14 through a vertical baking shaft 15 built as a baking space to an upper removal station 16. From the removal station 16 the separated baking sheet units 2 are transferred to a vertically downwards leading transport path located outside the baking shaft 15 and there they are lowered individually, before they are again directed to the vertically upwards leading transport path 13.

The closed baking molds and the baking sheet units 2 forming the same are transported upwards through the baking shaft 15 by the continuously replenished stack 18, consisting of loosely superimposed baking sheet units kept together only by the weight.

Inside the baking oven 1, the baking shaft 15 is limited towards the outside by a heat-insulating shell 19. Inside the baking shaft 15 and along the stack 18 gas burners 20 are arranged vertically on top of each other. The heating gases produced by them flow through the heating channels 4 of the baking sheet units 2 throughout the stack 18, thus heating the closed baking molds enclosing the pre-products, which are contained in the stack 18. At the bottom of the baking shaft 15, the stack 18 is continuously replenished with baking sheet units 2 supplied from a lower horizontal conveyor, by means of a stacking device 21 can. The stacking device 21 consist of a support device 23 assigned to the bottom end of the stack 18 and of a lifting device 24 arranged underneath the stack. The support device 23 is engaged with the lowermost baking sheet unit 2 of the stack 18, on which rests the weight of the entire stack 18. The support device 23 comprises two carriages 25, 26 which are located opposite from each other in a horizontal plane. These carriages 25, 26 are vertically supported in the frame of the baking oven 1 and are provided at mutually facing frontal sides with holding bolts 27, 28, which reach into the lateral holding openings 4 of the lowermost baking sheet unit 2 of the stack 18 and carry the entire weight of the stack 18. During a stacking process the two carriages 25, 26 are at first pulled apart for releasing the stack 18 and thereby are pulled out with their holding bolts 27, 28 from the lowermost baking sheet unit 2 of the stack 18, and then for fastening the stack 18, they are again pushed together and thereby pushed back with their holding bolts 27, 28 into the holding openings 4 of the newest lowermost baking sheet unit 2 of the stack.

The baking sheet units 2 to be stacked are transported by the horizontal conveyor 22 through a loading station 14, which precedes the vertical transport path 13 and the bottom end of the stack 18. This loading station 14 can for instance be built like a pouring station, wherein each time a measured amount of a pre-product prepared as a shapeless mass is poured onto the top side 2b of the respective baking sheet unit 2. The baking sheet units 2 loaded with the pre-product on the top side 2b is transported by the lower horizontal conveyor 22 under the stack 18 and there it is lifted from the lower horizontal conveyor 22 by a vertically displaceable ram 29 of the lifting device 24. This ram 29 presses the new baking sheet unit 2 to be integrated in the stack 18 from below against the lowermost baking sheet unit 2 of the stack 18, takes over its entire weight and thereby integrates this baking sheet unit 2 as the new lowermost baking sheet unit 2 in the stack 18. After the heretofore lowermost baking sheet unit 2 of the stack 18 is released by the support device 23, the ram 29 of the lifting device 23 lifts the entire stack 18 by the height of one baking sheet unit 2. Subsequently the support device 23 is brought into engagement with the new lowermost baking sheet unit 2 of the stack 18 and the stack 18 is deposited by the lifting device 24 onto the support device 23.

At the top of the baking shaft 15, the stack 18 is continuously separated into individual baking sheet units 2 by a separating device 30, which comprises a grip head 32 carried by an upper horizonal conveyor 31, which seizes the uppermost baking sheet unit 2 of the stack 18 electromagnetically or mechanically, lifting it from the stack 18 and transferring it to the vertical conveyor 33 of the vertically downward leading transport path 17 located outside the baking shaft 15.

When the gripping head 32 lifts the uppermost baking sheet unit 2 from the stack 18, the uppermost baking mold, which up to this moment was upwardly limited by this baking sheet unit 2, opens. The shaped body baked in this baking mold is left on the upper side of baking sheet unit, which up to this point limited this baking mold downwards. The former is now the uppermost baking sheet unit 2 of the stack 18, whose top side forms the top side of the stack 18.

The shaped bodies baked in the stack 18 are each removed in the removal station 16 by means for instance of a suction head (not shown) and guided to a discharge station 34 in the vicinity of the stack 18, through which they are discharged from the baking oven 1.

In the baking shaft 15 traversed by the stack 18 (FIG. 1), the gas burners 20 can be arranged vertically on top of each other on two opposite sides of the stack 18, alternately staggered with respect to each. The heating gases flowing from one side of the stack 18 into the heating channels 4 of the baking sheet units 2, after flowing though the baking sheet unit 2, escape on the opposite side of the stack 18 into the baking shaft 15. The heating gases leave the baking shaft 15 together with the heating gases escaping from the closed baking molds of the stack 18 through two upper exit openings 35, 36. The gas burners 20 and the thereto assigned exit openings 35, respectively 36 are arranged on different sides of the stack 18.

According to an alternate embodiment example (FIG. 2) the baking shaft 37 can be subdivided by a horizontal dividing wall in two superimposed shaft sections 39, 40, wherein the gas burners 41, 42 and the thereto assigned exit openings 43, 44 can be arranged on the same side of the stack 18, vertically above each other. Each shaft section 39, 40 contains a lower heating zone 39a, respectively 40a, wherein the gas burners 41, respectively 42 are arranged, and an upper heating zone 39b, respectively 40b, wherein an exit opening 43, respectively 44 of the baking shaft 39, respectively 40 is arranged. The gas burners 41, respectively 42 and the exit opening 43, respectively 44 are each separated from each other by an intermediate floor 45, respectively 46, which has a central opening 45a, respectively 46a for the passage of the stack 18 and a lateral floor opening 45, respectively 46 for the passage of the heating gases and baking gases from the lower heating zone 39a, respectively 40a into the upper heating zone 39b, respectively 40b.

The horizonal conveyor 22 arranged beneath the baking shaft 15 extends beyond the bottom end of the stack 18 to a discharge station 47 for the stackable baking sheet units 2 in the vicinity of the side wall 12a of the baking oven 1, shown on the right in FIG. 1, which has a service door (not shown) provided in the side wall 12a of the baking oven 1.

Via the discharge station 47 for the stackable baking sheet units 2, a baking sheet unit 2 which has been transferred by the vertically downwards leading transport path 17 to the lower horizontal conveyor 22, can be transported by the lower conveyor 22 bypassing the lower end of the stack 18 to the discharge station 47 and from there exit the baking oven 1. After the baking sheet unit 2 has been cleaned and serviced, the same can be reintroduced in the baking oven 1 via the discharge station 47 and transported by the lower horizontal conveyor 22 to the stacking device 21, without having to dismount or dismantle parts of the baking oven 1.

The discharge station 47 for the stackable baking sheet units 2 makes possible the replacement of individual baking sheet units 2 via the discharge station 47 with other baking sheet units 2, this way refitting the baking oven 1 for the production of other thin-walled shaped bodies. So for instance stackable baking sheet units 2 provided for the production of flat layers can be exchanged for stackable baking sheet units provided for shallow trays.

The stack 18 forming the transport path 13 leading vertically upwards in the baking oven 1 consists of superimposed baking sheet units 2 which are integrated one after the other into the stack 18 due to successive stacking processes of the lower stacking device 21, and after travelling through the stack 18 and the baking shaft 15 are again removed from the stack 18 by the separating device 30 at the top end of the stack 18.

With each stacking process one new baking sheet unit 2, which has already been loaded with the pre-product on its top side 2a, is integrated from underneath into the stack 18. The new baking sheet unit 2 is transported by the lower horizontal conveyor 22 under the bottom end of the stack 18 and, by means of the ram 29 of the lifting device 24 arranged at the bottom, is lifted from the lower horizontal conveyor 22 towards the bottom end of the shaft 18 and pressed with its top side 2a against the bottom side of the stack 18. Subsequently the new baking sheet unit 2, together with the stack 18 resting thereon, is further lifted by the ram 29 of the lifting device 24 and the stack 18 with it heretofore lowermost baking sheet unit 2 is lifted from the horizontal holding bolt of the thereto assigned holding device 23. The holding bolts are pulled out from the heretofore lowermost baking sheet unit 2 of the stack 18 due to the fact that their supporting carriages are pulled apart horizontally. The stack 18 is further lifted by the ram 29 of the lifting device 24, until the lateral holding openings of the new and now lowermost baking sheet unit 2 of the stack 18 are directed towards the horizontal holding bolts of the holding device 23. Now the two carriages of the holding device 23 are pushed together and the holding bolts are pushed into the holding openings of the new lowermost baking sheet unit 2 of the stack 18. Subsequently the ram 29 of the lifting device 24 is lowered to its initial bottom position, whereby it first deposits the stack 18 on the holding bolts of the holding device 23, before it is lowered alone below the transport level of the lower horizontal conveyor 22. Subsequently the lower horizontal conveyor transports the next baking sheet unit 2 which on its top side 2a has already been loaded with the pre-product under the bottom end of the stack 18 and the next stacking process starts.

During each stacking process the already loaded lower baking mold half formed on the top side 2a of the baking sheet unit 2 to be integrated is pushed from below with its upwards pointing sealing strips against the downwards pointing sealing strips of the baking mold formed on the bottom side 2b of the lowermost baking sheet unit 2 of the stack 18, and both mold halves form a closed baking mold.

With each stacking process at the bottom end of the stack 18 a new closed baking mold is formed, whose hollow mold space is defined upwards and downwards by the mutually facing baking surfaces of the two lowermost baking sheet units 2 of the stack 18, and laterally by the superimposed sealing strips of these two baking sheet units. This hollow mold space is completely closed, except for the steam slots provided in the sealing strips. The shapeless mass enclosed in the hollow mold space due to the closing of the baking mold during the stacking process is baked into thin-walled shaped body formed like a flat layer, while the hollow mold space, together with the baking sheet units 2 delimiting it, travels stepwise upwards in the stack 18 through the baking shaft 15. During this baking process, the shapeless mass is foamed by the baking gases generated therein and distributed through the hollow mold space, before the baking gases leave the hollow mold space through the steam slots and escape from the closed baking mold into the baking shaft 15. The inner pressure generated during baking inside the hollow mold space, which increases rapidly in the initial phase and after a short time decreases again rapidly, is counteracted by the weight of the respective part of the stack 18 lying on top of the hollow mold space. The hollow mold space travels upwards in the stack 18 by one level with each new stacking process, and the part of the stack 18 lying on top of it becomes smaller and lighter with each baking sheet unit 2 removed at its top end. During the entire baking process, the inner pressure generated in the hollow mold space is always clearly smaller than the pressure exerted from above on the hollow mold space by the weight of the part of the stack 18 lying on top of it. This is achieved due to the high weight of the stack 18, which is determined by the weight of the individual baking sheet units 2 and by the number of the baking sheet units 2 stacked on top of each other.

At the top end of the stack 18 the hollow mold space is kept closed only by the weight of the baking sheet unit 2 bordering it on the top and when this baking sheet unit 2 is lifted while the stack 18 is being dismantled, it is also opened. For the separation of the baking sheet units 2 at the top end of the stack 18 the gripper head 32 of the upper horizontal conveyor 31 is passed over the top end of the stack 18 and kept on standby until the stack 18 is lifted to its uppermost position during a stacking process performed by the lifting device 24 arranged beneath the stack. Then the gripping head 32 seizes the uppermost baking sheet unit 2 of the stack 18 and holds it, while the stack 18 is again lowered by the lifting device 24 and the heretofore second to uppermost, and now the uppermost baking sheet unit 2 is removed downwards from the baking sheet unit 2 held by the gripping head 32. As a result the baking mold previously formed by the two uppermost baking sheet units 2 of the stack 18 is opened, whereby the baked shaped body is left lying on the top side of the now uppermost baking sheet unit 2 of the stack 18 and is removed from there, while the gripping head 32 transports the removed baking sheet unit 2 to the upper end of the vertical conveyor 33 arranged outside the baking shaft 15. The gripping head 32 of the upper horizontal conveyor 31 is again passed over the top end of the stack 18, before the same is lifted again to its uppermost position by its lifting device 24 during its next stacking process and the next separation process starts.

What is claimed is:

1. Baking oven for the production of thin-walled shaped bodies in baking molds defined by the top and bottom sides of stackable baking sheet units lying loosely on top of each other within a continuously renewed and dissolved stack supported on a bottom holding device and extending through a vertical baking shaft up to a removal station for the baked thin-walled shaped bodies, each baking mold being defined by two superposed baking sheet units and being kept closed only by the weight of the stack portion above it while being moved stepwise upwards within said stack and through said baking shaft, each baking sheet unit being loaded with pre-product in a bottom loading station and integrated into said stack beneath said baking shaft by a stacking unit and removed from said stack above said baking shaft.

2. The baking oven of claim 1 further comprising a baking sheet unit separation device above said baking shaft or removing said baking sheet units one after the other from the top of said stack and for opening said baking molds.

3. The baking oven of claim 1 further comprising a vertical conveyor outside said baking shaft for conveying said baking sheet units back to said bottom loading station.

4. The baking oven of claim 1, wherein said baking sheet units comprise upper and lower stacking surfaces cooperating with one another within said stack.

5. The baking oven of claim 1, wherein on the top sides of said baking sheet units several baking mold parts designed as lower mold halves are arranged next to each other and on the bottom sides of said baking sheet units several baking mold parts designed as upper mold halves are arranged next to each other.

6. The baking oven of claim 1, wherein the top and bottom sides of said baking sheet units define baking mold halves with sealing strips with integrated stacking surfaces and said baking sheet units lie loosely on top of each other within said stack with the sealing strips of their baking mold halves.

* * * * *